United States Patent [19]

Russell

[11] 4,032,165
[45] June 28, 1977

[54] DISASSEMBLABLE ARTICLE TRANSPORT, STORAGE AND HANDLING TRUCK

[76] Inventor: Herman F. Russell, 7350 Brantford Road, Dayton, Ohio 45414

[22] Filed: Oct. 9, 1975

[21] Appl. No.: 620,958

[52] U.S. Cl. .............................. 280/79.3; 211/123; 211/189; 211/204; 280/33.99 T
[51] Int. Cl.² ........................................ B62B 3/02
[58] Field of Search .......... 280/33.99 T, 79.1, 79.2, 280/79.3, 638, 651, 47.34; 248/165; 211/123, 124, 186, 191, 192, 193, 189, 204, 206

[56] References Cited

UNITED STATES PATENTS

| | | | |
|---|---|---|---|
| 1,169,157 | 1/1916 | Honold | 280/79.3 |
| 1,426,225 | 8/1922 | Short | 211/204 |
| 1,632,808 | 6/1927 | Sztogryn | 280/79.3 |
| 2,482,979 | 9/1949 | Isakson | 248/165 |
| 3,146,892 | 9/1964 | White | 211/204 |
| 3,240,505 | 3/1966 | Schiernitzauer | 280/79.3 |
| 3,387,855 | 6/1968 | Oliver | 280/79.3 |
| 3,523,694 | 8/1970 | Oliver | 280/33.99 T |
| 3,582,102 | 6/1971 | Bewick | 280/33.99 T |
| 3,705,731 | 12/1972 | Berchak | 280/651 |
| D182,483 | 4/1958 | Skinner | 280/79.3 |

FOREIGN PATENTS OR APPLICATIONS

| 107,315 | 5/1939 | Australia | 280/79.3 |
|---|---|---|---|

*Primary Examiner*—Joseph F. Peters, Jr.
*Assistant Examiner*—David M. Mitchell
*Attorney, Agent, or Firm*—Willis Bugbee

[57] ABSTRACT

Rising from the opposite ends of an elongated rectangular base structure equipped with casters are two tubular uprights interconnected at their upper ends by a cross bar having opposite overhanging ends and brackets projecting therebeyond. The lower portions of these uprights are detachably bolted to upstanding upwardly convex arcuate braces secured to the opposite ends of the base structure. The cross bar and its end brackets are similarly detachable as a unit from the upper ends of the uprights whereby the truck may be disassembled into a compact space for return to its starting point. The base structure is so constructed as to nest with the base structures of similar trucks, so that when the articles transported from the warehouse to the destination have been delivered by several such trucks, these may be disassembled in the foregoing manner and their base structures stacked one upon the other for compactness of shipment or storage. The base structures are spaced by the casters a sufficient distance above the floor to receive the forks of forklift trucks. This truck is particularly well adapted for handling meat carcasses which have been subdivided into so-called quarters and are to be further subdivided at their destination, whereupon they are suspended one at a time from the overhanging ends of the cross bar.

3 Claims, 7 Drawing Figures

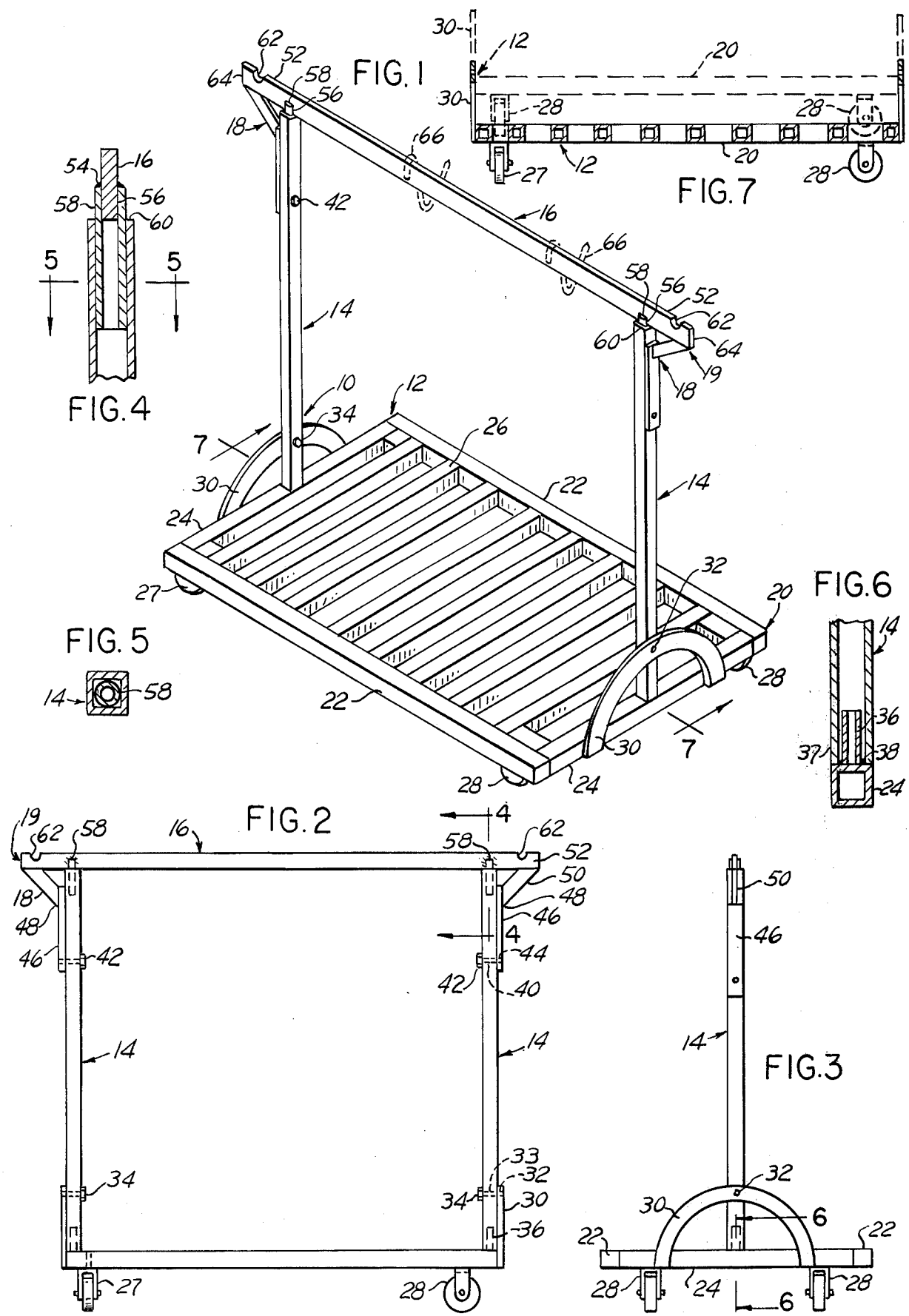

DISASSEMBLABLE ARTICLE TRANSPORT, STORAGE AND HANDLING TRUCK

BACKGROUND OF THE INVENTION

Hitherto, meat carcasses or the subdivisions thereof known as quarters have been transported within warehouses and market buildings by being suspended by hooks from overhead rails built into the buildings as well as being stored within such buildings and their refrigerated spaces. Transport between buildings located remote from one another has been largely by motor truck or by refrigerated railroad cars, similarly equipped with overhead rails. These hooks have frequently been mounted on or incorporated with trolleys movable freely along such overhead rails. Such rail installations are expensive to install or to construct in a new building or to adapt into an old building, as well as hazardous to workers within such buildings because they act as obstacles causing injuries to the unwary passersby. These overhead rail installations are also rigid, inflexible and unwieldy, and incapable of inexpensive and rapid conversion or rearrangement within buildings.

The present invention dispenses with these overhead rail installations and conveyor systems patterned thereon and replaces them by relatively inexpensive trucks capable of easy handling manually or by self-propelled forklift trucks. The trucks of the present invention when handling has been completed are simply and easily disassembled for storage and/or return to their original starting point.

SUMMARY OF THE INVENTION

The invention particularly resides in the base structure which casters forming a first unit, a pair of uprights forming second and third units, and a cross bar with attached end brackets forming a fourth unit. All of these units are capable of quick assembly and disassembly relatively to one another and the base structures are so constructed as to be capable of stacking in nested relationship.

In the drawing,

FIG. 1 is a perspective view of a disassemblable article transport, storage and handling truck, according to one form of the invention, as arranged for handling meat carcasses, such as so-called beef quarters suspended from the hooks shown in dotted lines;

FIG. 2 is a left-hand side elevation of the truck shown in FIG. 1;

FIG. 3 is a right-hand end elevation of the truck shown in FIG. 2;

FIG. 4 is an enlarged fragmentary vertical section taken along the line 4—4 in FIG. 2, showing the disassemblable connection between the cross bar and one of the uprights;

FIG. 5 is a cross-section taken along the line 5—5 in FIG. 4;

FIG. 6 is an enlarged fragmentary vertical section taken along the line 6—6 in FIG. 3, showing the separable connection between the base structure and one of the uprights; and FIG. 7 is a central vertical section through the base structure of FIG. 1, taken along the line 7—7 therein, showing in dotted lines a similar separable base structure nested thereon for transport or storage.

Referring to the drawing in detail, FIGS. 1, 2 and 3 show a disassemblable article transport, storage and handling truck, generally disignated 10, as consisting generally of an elongated caster-equipped rectangualr base structure 12, a pair of uprights 14 detachably mounted thereon, and a cross bar structure 16 detachably mounted on top of the uprights 14 by means of overhanging end brackets 18 welded or otherwise secured thereto and collectively constituting an article suspension unit, generally designated 19. The base structure 12 includes a rectangular base frame 20 composed of lonitudinal or side bars 22 between which are mounted end bars 24 and longitudinally-spaced intermediate bars 26. Secured to this framework 20 near one end thereof is a pair of swivelling casters 27 and near the opposite end thereof a pair of stationary casters 28, all these being spaced inwardly from the side bars 22 and end bars 24 (FIGS. 2 and 3) and mounted on two of the intermediate bars 26.

Welded or otherwise secured to each of the end bars 24 midway between the opposite ends thereof is an upstanding arcuate upwardly convex brace 30. Each brace 30 has at its uppermost location a threaded bolt hole 32 adapted to threadedly receive a bolt 34 (FIG. 2). Cooperating with the bolt 34 and bolt hole 32 immediately below the latter is an upstanding lower coupling tube 36 (FIG. 6) welded or otherwise secured at 38 to its respective end bar 24. The side bars 22, end bars 24, intermediate bars 26 and uprights 14 are all preferably of hollow steel tubing of square cross-section (FIGS. 5 and 6). Each of the uprights 14 is adapted to its lower end 37 to detachably telescope with one of the lower coupling tubes 36 (FIG. 6), these being also cut from steel tubing. Each upright 14 is drilled in line with one of the bolt holes 32 for the passage of one of the bolts 34 (FIG. 2).

Each of the uprights 14 near its upper end is drilled transversely at 40 (FIG. 2) to detachably receive a bolt 42 passing therethrough and threaded into a threaded hole 44 in the base plate 46 of a bracket 48 including an oblique or diagonal brace 50 welded on otherwise secured at its lower end to the base plate 46. The upper end of the brace 50 is similarly secured to the overhanging end portion 52 of the cross bar 16.

The cross bar 16 is in the form of an elongated rail bar of rectangular cross-section (FIG.4), the portion near the bracket 48 and immediately above its respective upright 14 being seated and welded or otherwise secured at 54 in a slot 56 in the upper end of an upper coupling tube 58 (FIGS. 4 and 5). The upper coupling tube 58 is disposed in telescoping relationship with its respective upright 14 in such a manner that each opposite end portion of the cross bar 16 rests upon the top end 60 of its respective upright 14. The outwardly-projecting opposite end portions 52 of the cross bar 16 overhanging the base structure end bars 24 are provided with notches 62 near their opposite ends 64 for the reception of meat hooks, such as are shown at 66 in dotted lines in FIG. 1 near the midportion of the cross bar 16.

In the use of the truck 10 (FIGS. 1 and 2), let it be assumed that the truck 10 is in its assembled form as shown in the drawing and that it is desired to transport and handle meat carcasses thereon from the warehouse to the market where the carcasses are to be further subdivided by a butcher. The carcasses are mounted upon conventional meat hooks 66 and suspended from the cross bar 16 in side-by-side relationship until a full load of such carcasses, such as beef quarters, is installed upon the cross bar 16. The truck 10 may then be pushed along the warehouse floor by hand because of its casters, 28, or upon the forks of a forklift truck run beneath the base frame 20. The entire load is thus conveyed and hoisted onto the motor truck by which it is to be transported to its destination. Because of the casters 28, the loaded truck 10 may be pushed up a ramp as well as along the floor.

When the motor truck carrying the required number of the loaded article transport trucks 10 arrives at its destination, such as a supermarket, the loaded truck or trucks 10 are again rolled down a ramp or along the floor of the loading dock or handled by a forklift truck, whichever is the most suitable and convenient arrangement at the particular location. Each article transport truck 10 is then transported either by hand or by forklift truck into the refrigerated storage room of the supermarket where it awaits handling by the butcher. When it is time to further subdivide one of these quarters or other meat carcasses, the butcher removes it by means of its extension hook 66 from the truck bar 16 and places the hook in the notch 62 of the overhanging end portion 52 from which the carcass portion is now suspended. He then proceeds to cut the carcass up into eihths or smaller subdivisions in the usual manner by means of meat saws or the like and conventional butcher tools. This work is carried out with each carcass in turn in the above manner until the cross bar 16 of the particular truck 10 has been unloaded.

After all of the carcases have been handled in this manner, the article transport truck 10 is then disasembled in order to return it with other such disassembled trucks 10 to the warehouse while occupying the minimum of space aboard the transporting motor vehicle. The operator performs this disassembling by first loosening the upper bolts 42 and unthreading them from their threaded holes 44. Thereupon the operator lifts the article suspension unit 19 consisting of the cross bar 16 together with its brackets 48 and upper coupling tubes 58 of the upper ends of the uprights 14. Laying this unit 19 aside, he then in a similar manner removes the bolts 34 from the threaded holes 32 in the braces 30 and withdraws the bolts 34 from the bolt holes 33 in the lower portions of the uprihts 14. The uprights 14 are then removed by lifting their lower end portions 37 (FIG. 6) off the lower coupling tubes 36. To avoid losing the bolts 34 and 42, they are then threaded back into their respective bolt holes 32 and 44. The base structure 12 may then be nested with similar base structures 12 in the manner shown in FIG. 7 and the article suspension units 19 and uprights 14 placed along side one another for storage or for transportation back to the warehouse in a compact space-saving manner.

I claim:

1. A disassemblable heavy duty article transport, storage and handling truck adapted to be moved along a floor, said truck comprising
    an elongated generally rectangular base structure having laterally- spaced opposite sides and having longitudinally-spaced opposite ends with mid portions thereon,
    casters secured to and rollably supporting said base structure in vertically-spaced relationship to the floor whereby to provide space for the insertion of forklift truck forks beneath said base structure,
    a pair of upstanding open-centered brace members secured to and extending along a respective opposite end of said base structure in laterally- disposed relationship to said base structure,
    each brace member having a central portion disposed above and remote from the mid-portion of a respective end of said base structure,
    each brace member having opposite end portions secured to said nearer end of said base structure remote from said mid-portion thereof,
    a pair of upright members disposed adjacent said brace members in detachable supported relationship with said base structure,
    means separably connecting said brace members to the upright members adjacent thereto,
    an elongated article suspension structure detachably secured to the upper end portions of said upright members in spaced parallel relationship to said base structure,
    and means separably connecting said article suspension to said upper end portions of said upright members.

2. A truck, according to claim 1, wherein said brace members are of upwardly convex arcuate configuration with opposite ends secured to said opposite ends of said base structure and with central portions connected to said upright members.

3. A disassemblable heavy duty article transport, storage and handling truck adapted to be moved along a floor, said truck comprising
    an elongated generally rectangular base structure having laterally-spaced opposite sides and longitudinally-spaced opposite ends,
    casters secured to and rollably supporting said base structure in vertically-spaced relationship to the floor whereby to provide space for the insertion of forklift truck forks beneath said base structure,
    a pair of upstanding brace members secured to said opposite ends of said base structure,
    a pair of upright members disposed adjacent said brace members in detachable supported relationship with said base structure,
    means separably connecting said brace members to the upright members adjacent thereto,
    an elongated article suspension structure detachably secured to the upper end portions of said upright members in spaced parallel relationship to said base structure,
    and means separably connecting said article suspension structure to said upper end portions of said upright members,
    said article suspension structure including an article suspension member having a length greater than the horizontal distance between said upright members and having an end portion projecting beyond one of said upright members in overhanging relationship thereto,
    said article suspension structure also including a bracket having an upper portion connected to said end portion of said article suspension member and extending obliquely downward therefrom into abutting engagement with the upright member adjacent thereto,
    said bracket also including a vertical lower portion secured to and extending downward from said obliquely-extending upper portion into abutting engagement with its respective upright member.

* * * * *